(No Model.)

N. BUTLER.
Apparatus for Sulphurizing or Paraffining Friction Matches.

No. 237,368.  Patented Feb. 8, 1881.

Witnesses:
John Grist
Fred. J. Ross

Inventor:
N. Butler
By Henry Grist
Attorney.

UNITED STATES PATENT OFFICE.

NATHAN BUTLER, OF HULL, QUEBEC, CANADA, ASSIGNOR TO EZRA BUTLER EDDY, OF SAME PLACE.

APPARATUS FOR SULPHURIZING OR PARAFFINING FRICTION-MATCHES.

SPECIFICATION forming part of Letters Patent No. 237,368, dated February 8, 1881.

Application filed August 18, 1880. (No model.)

*To all whom it may concern:*

Be it known that I, NATHAN BUTLER, of the city of Hull, in the county of Ottawa, in the Province of Quebec, Canada, have invented certain new and useful Improvements on Apparatus for Sulphurizing or Paraffining Friction-Matches; and I do hereby declare that the following is a full, clear, and exact description of the same.

The object of this invention is to artificially dry and then mechanically saturate the ends of matches in racks or rolls with paraffine or sulphur at one continuous operation, previous to their being headed with a phosphorous composition; and my invention consists of a furnace or steam-block having near one end a heated surface with rails thereon, an adjoining pan having a shallow portion with rails at the opposite end, and an endless apron or chains within the pan, whereby the racks or rolls of matches are dried upon the heated surface, then partially submerged by the endless apron in the paraffine or sulphur in the pan, and delivered from the apron to drain on the rails within the pan at its shallow end, and a pushing device feeding the racks or rolls of matches from the heating-surface to the endless apron.

Figure 1:
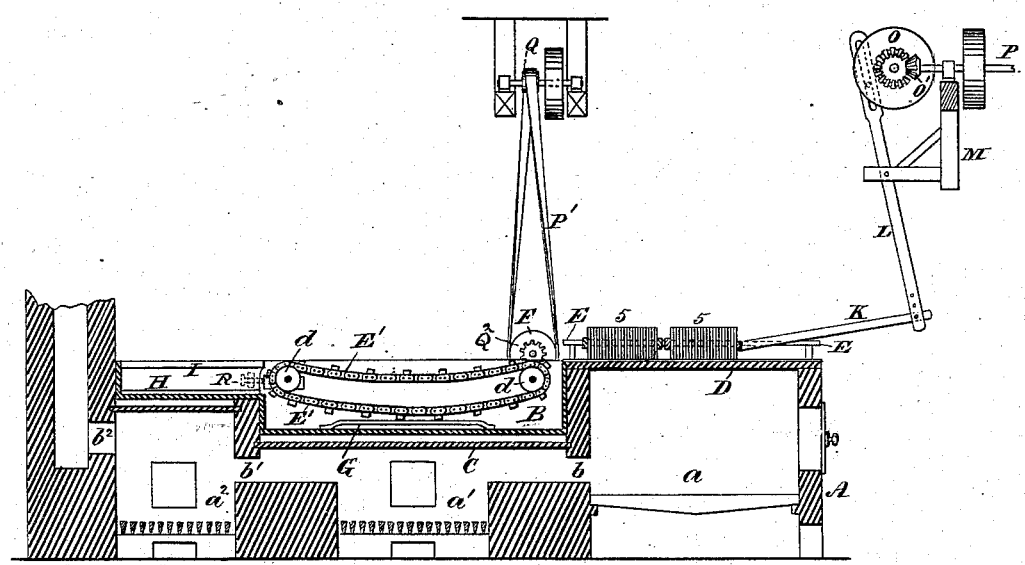
Figure 2:
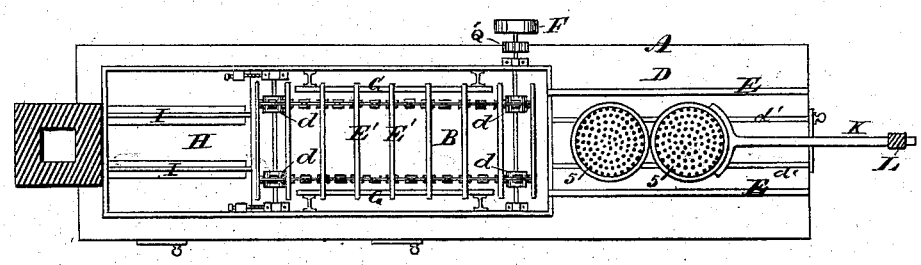

Figure 1 is a longitudinal vertical section of my apparatus, and Fig. 2 is a top view of the pan portion of the same.

A is the furnace-block, having fire-chambers $a$ $a'$ $a^2$ connected by flues $b$ $b'$ $b^2$, the latter discharging into a chimney.

B is a metal tank or pan, in which the sulphur or paraffine is placed and heated by the furnace under the same.

C is a fire-plate underneath the bottom of the pan B, to prevent direct contact of the fire.

D is a metal plate on top of furnace $a$, and heated thereby. On top of plate D are metal rails E E, longitudinally with the pan B, to carry the matches when in square racks; but when in rolls 5, as shown in the drawings, the rolls are placed upon thin strips $d'$ of flat iron on the plate D, the heat therefrom evaporating the moisture from the ends of the matches previous to being dipped in the sulphur-bath. The rails, being elevated above the plate, are cool, and are used to support the match-racks, which, being heavy, would cause too much friction if borne by the ends of the matches bearing on the flat strips $d'$ of the heated plate.

Within the pan B is loosely mounted an endless apron or chains, E', driven by sprocket-wheels $d$ $d$ $d$ $d$ from a band-pulley, F, and intermediate gear-wheels, said apron or chains sagging below the surface of the sulphur or paraffine in the pan to a sufficient depth to dip the ends of the matches.

G G are longitudinal bars on the bottom of the pan, to prevent the endless apron or chains from frictional contact therewith and prevent tightness on the top strain of the apron.

H is a shallow portion of the pan B, above the fire-chamber $a^2$, said portion H supporting horizontally rails I I, on which the rolls or racks of matches are delivered by the endless apron or chains after being sulphurized or paraffined, the drip flowing into the pan B. From the rails I I the racks or rolls of matches are removed by hand. The racks or rolls are fed to the endless apron or chains, after being placed on the rails E E or the thin strips $d'$ on bottom of plate D, by a pushing-arm, K, on one end of a lever, L, fulcrumed to a hanger, M, the opposite end of the lever having a longitudinal slot engaging with a wrist-pin of a cog-wheel, O, meshing with a beveled pinion, O', on the pulley-shaft P.

The endless apron-pulley F is driven by gear-wheels Q' Q², belt P', and pulley Q.

R is an adjusting-screw for loosening or tightening the apron to suit the depth to which the matches are to be submerged.

The furnace-block may, if desired, be dispensed with, and the pan and plate heated by steam by means of a steam-space below the same fed from a steam-boiler.

I am aware that a match-machine has been patented by W. Gates and H. J. Harwood, April 4, 1854, which has an endless chain formed of a series of clamps, receiving the match-sticks from a cutting-tool and conveying them to the sulphur and igniting compounds, into which their lower ends are dipped; and I disclaim an endless apron or chain not wholly contained within the pan in which the matches are dipped.

I claim as my invention—

1. The combination of furnace A, pan B, having shallow portion H, with rails I I at one end, exterior heating-surface, D, with rails E d' contiguous to the opposite end of the pan, sprocket-wheels d, and endless apron or chains E' wholly within the pan, and a pushing device for feeding the racks or rolls of matches from the heating-surface D to the endless apron E', whereby the matches are dried, dipped, delivered, and drained at one continuous operation, as set forth.

2. The combination of the heating-surface D, having rails E d', pan B, having shallow portion H, with rails I I and endless apron or chains E', wholly within the pan, for the purpose set forth.

3. In combination with the pan B and a plate or raised heating-surface, D, a pushing device for feeding the matches to the apron or chains E', consisting substantially of arm K, slotted lever L, fulcrum M, and gear-wheels O, having a wrist-pin connection with slotted lever L, and driven by beveled pinion O', as set forth.

NATHAN BUTLER.

Witnesses:
 FRED. J. ROSS,
 JOHN GRIST.